INVENTOR.
George O. G. Löf

Oct. 20, 1959   G. O. G. LÖF   2,909,171
SOLAR COOKER

Filed Aug. 1, 1955   2 Sheets-Sheet 2

INVENTOR.
George O. G. Löf
BY
*Matthew Edwards*
ATTORNEYS

United States Patent Office 2,909,171
Patented Oct. 20, 1959

2,909,171

SOLAR COOKER

George O. G. Löf, Englewood, Colo.

Application August 1, 1955, Serial No. 525,551

3 Claims. (Cl. 126—270)

This invention relates to a portable solar cooker for general applicability as a portable home barbecue and the like, and particularly to a highly mobile, folding, umbrella-type solar cooker for out-door, away-from-home uses.

Solar heating has intrigued man for ages, especially since the sun has long been recognized as a tremendous potential source of usable heat. Recently a substantial amount of work has been done on the use of solar energy as a low-cost heat source. Cooking by solar radiation has, also, been investigated from time to time, and recently in India solar cookers were investigated as a remedy for the lack of readily available cooking fuel in that overcrowded land. Several types of cookers were investigated to find one adequate for the needs of the Indian people, and while it was discovered that sufficient solar heat could be generated for cooking none of the cookers devised has had very wide usage.

According to the present invention a folding, umbrella-type solar cooker is provided, which is simply and easily set up, and is operated for effectively cooking various foods by heat from solar radiation. The cooker provides a relatively large parabolic-type reflector which provides a novel focus arrangement for gathering the sun's rays and focusing them into a zone so as to distribute the heat for effective cooking without burning the food or the containers. The cooker folds into a relatively small package for storage or transportation in a manner similar to an umbrella, and is quickly and easily assembled into a parabolic reflecting device, which may be used to quickly and effectively cook the food placed in the focus zone of the reflector. The cooker in its small, folded condition is highly portable, but is easily and quickly set up for use. Means are provided for holding and cooking various types of food including liquids, solids, etc.

Included among the objects and advantages of the present invention is to provide a highly portable solar cooker which is foldable into a small, compact package convenient for storage or portability. The device provides a parabolic type reflector having a relatively short focal length and which provides focusing of the reflected rays into a zone so as to provide effective heating of the cooking area without overheating so as to burn the food or the food containers or the supports for such containers. Means are provided for maintaining the cooker in position for use, and holding means are provided for supporting cooking utensils and/or solid food in the focal zone of the device. The unit provides an easily assembled and easily operated solar cooker.

These and other objects and advantages of the invention may be readily ascertained by referring to the following description and appended illustrations in which.

Figure 1:
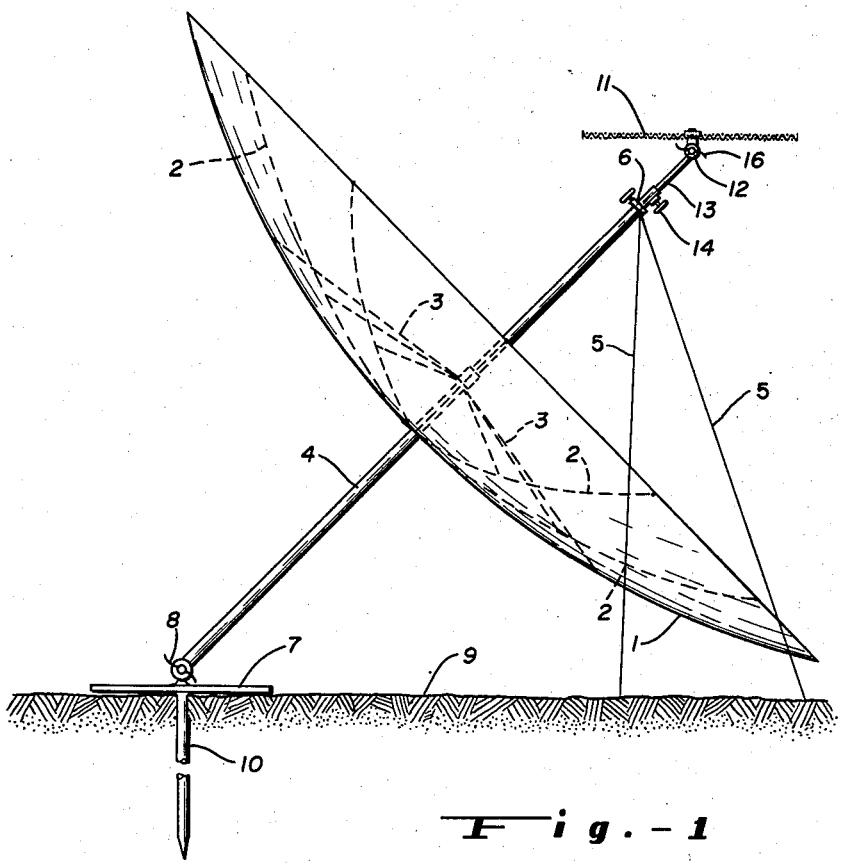
Fig. 1 is an elevational view of a solar cooker according to the invention, assembled for use.

The cooker illustrated in Fig. 1 comprises a flexible member 1 having a reflective surface which is stretched on ribs 2 to form a substantially parabolic reflecting surface. More precisely, the device provides a plurality of parabolic reflecting surfaces, each intersecting or joined to a neighbor at a rib of the frame. The reflective surface is placed inside the flexible member adjacent the ribs, and the ribs are braced by means of braces 3 holding the ribs in open position. The unit is mounted on a rod support 4 and a system of guy wires 5 may be used to prevent the device from blowing away in the wind. The rod is mounted on a base 7 by means of a thumb screw 8, which permits the angle of the rod in relation to the ground 9 to be changed. A stake 10 secured to the base 7 is adapted to be pushed into the ground to maintain the device in operative position. The whole reflector system may be turned to follow the sun by rotating the stake 10 and base 7. The rod 4 extends through the parabolic reflector 1 and is sufficiently long to permit the reflector to be tilted, up to about 60°, so as to have the reflector aperture substantially perpendicular to the sun during use. The rod 4 extends through the opposite side of the reflector and is interconnected with a food or utensil support 11 placed in about the focal zone of the reflector. The food holder 11 is mounted on a uni-directional joint 12 whereby the angle of the holder 11 may be positioned in relation to the reflector, and the holder may be positioned lengthwise from the reflector by means of a rod 13 telescoping with the rod 4 and controlled by a clamp thumbscrew 14.

The reflective surface, which is described in detail below, is made of a series of generally triangular shaped flexible segments, Fig. 10, and the inner surface of each is metalized or otherwise covered with a specular film or sheet, overlaid, if desired, by a transparent film, such as plastic, for protection of the specular surface, so as to provide a highly reflective surface for reflecting the sun's rays. The segments are joined together and are supported on the rib framework of the umbrella-type with the metallized surface in the inside of the parabolic shaped surface.

In open position, the general cross sectional outline of the reflector surface is parabolic. However, each segment has the shape of a generally triangular portion of a parabolic cylinder. The segments are joined at their edges to form, in open position, a generally umbrella-shaped reflector. In Fig. 10, the plan view of the segment shows the segment as substantially flat along lines $a$, $b$, $c$, etc., while the side elevation of Fig. 11 shows the segment is parabolic in a direction along the median line $d$, seen in Fig. 10, extending from the base 24 of the segment to the vertex thereof. The median line $d$ is a parabola. The vertices of the parabolas $d$ lie at the common intersection point of the segments. The generally triangular panel or segment 15 has sides 18 and 19 which are slightly curved outwardly or convex, but curvature is so slight it is not readily shown in small scale. The slight curve is essential, however, to produce a final product which is capable of being stretched over the frame to produce the desired characteristics.

Figures 10, 11:
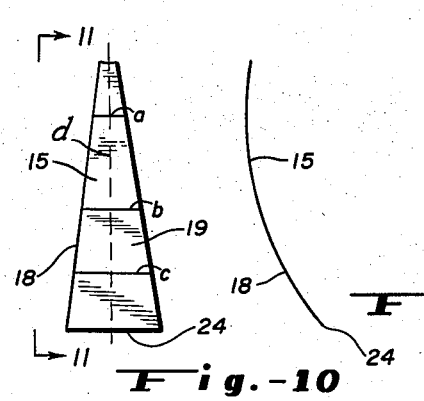
Fig. 10 is a plan view of one segment of the reflective surface.
Fig. 11 is an elevational view of the segment of Fig. 10.

The term "generally triangular" as used herein, includes the truncated triangular shape shown in Fig. 10 as well as complete triangles.

The term "parabolic cylinder," as used herein, means a surface generated by a moving straight line which always intersects a parabola, and remains parallel to a fixed straight line normal to the plane of and passing through the focus of said parabola.

Each segment 15 of the reflector has a line focus, that is, at the focal length of the true parabola, shown as a side view of the segment in Fig. 11, there is a bright, hot line the length of the outer edge 24 of the segment. Referring to Fig. 10, the part of the segment at line $a$ will produce a focal line of that length at the focal distance of the parabola. Line $b$ will, also, produce a line focus at the focal distance, the length of line $b$, superimposed on line $a$. Each section of the segment will produce a line focus at the focal distance, superimposed on one another, producing a line which is very hot in the center and tapering to the ends which are the same distance apart as outside edge 24. Each segment reflects a similar bright line which is perpendicular to the plane of the median line $d$ of the segment, which is, of course, slightly spaced apart from the reflected line of the neighboring segments. The lines intersect at a common point, called the theoretical focus point, forming a spot with lines radiating away like the spokes of a wheel, forming a focal zone. Moving toward or away from the reflector, leaving the focal zone, broadens and "fuzzes" each line, thereby reducing the concentration of heat and diluting it somewhat more uniformly over an area.

In one size, the cooker of the invention utilizes a surface having an aperture of about thirty-four inches. A true parabolic surface of this size with a highly reflective, specular surface focused on its focal point would provide a spot having a temperature of several thousand degrees F., which is, obviously, not satisfactory for cooking nor safe since the "hot spot" is not visible. The device of the invention avoids such a small "hot spot" so that it is safe for the user and utensils used with it.

The food support 11 may be a grill or screen for solid foods such as steaks, roasts, and the like, which may, also, hold utensils, or it may be various types of holders for containers for liquids and the like. It is important, however, to be able to adjust the food holder in relation to the focal zone of the device since some foods should be cooked at lower temperatures than others. The adjustable support of the screen 11 permits it to be placed directly in the focal zone, above or below it, or at one edge thereof so as to permit controlling the amount of heat actually concentrated.

Figure 2:
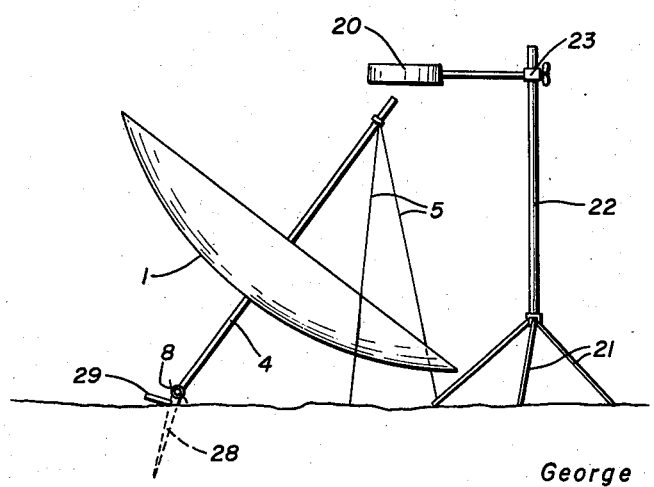
Fig. 2 is an elevational view of a cooker of the invention, using a modified holder for a food container.

The device of Fig. 2 illustrates a modified food holder which provides a separate unit independent of the cooker. In this instance, the reflector 1 is mounted on its rod 4 in the manner similar to Fig. 1. However, a food container holder 20 is mounted on a tripod stand which includes tripod legs 21 and an upright support 22. The holder 20 is adjustably mounted by means of a clamp thumb screw 23 on the rod 22 so that it may be moved in relation to the focal zone of the cooker. This separate unit facilitates the handling of food and the food containers since it may be moved away from the reflective surface.

Figure 3:
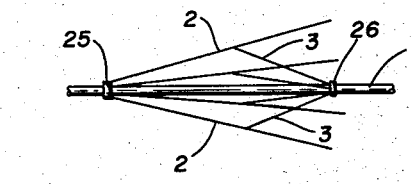
Figs. 3 and 4 illustrate the closed and partially open positions, respectively, of a frame for a reflective surface of a cooker according to the invention.
Figure 4:
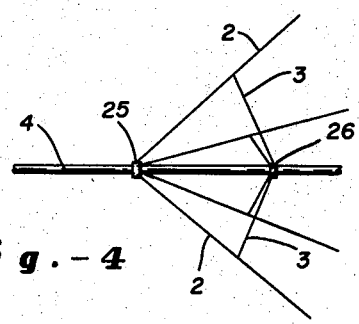

In Figs. 3 and 4, the operation of the frame of the cooker of the invention is illustrated. The ribs 2 are connected to a slider 25 reciprocally mounted on the rod 4 at one end and the braces 3 are interconnected to ribs near the centers thereof. The opposite end of the braces 3 is connected with a fixed pivot 26. The reflector is opened by moving the slider, which is at the peak of the ribs, as illustrated in Fig. 4. The frame is partially opened, toward the fixed pivot 26 which forces the ribs 2 to spread outwardly. The covering for the frame is made parabolic in shape, due to the shape of the segments, and as the frame is pushed to open position, the ribs, which are flexible, bend to assume the parabolic shape of the covering and to hold it taut. The slider 26 may be made the fixed pivot, and the pivot 26 may be made a slider so that the device opens in the manner of an umbrella, rather than having the peak of the ribs slide up and down the rod.

The covering for the device must have a highly reflective, or specular surface adjacent the ribs, so that rays from the sun can be gathered and focused into a focal zone. One effective member which may be used is thin, transparent, plastic film made by Du Pont, called "Mylar," which is a polyester type polymer. The film is aluminized by depositing a thin film of aluminum, by vaporization of aluminum, on the surface of the film. The aluminized "Mylar" is too thin for use by itself, so it is laminated to a heavier plastic, fabric, or the like. A clear plastic covering may be placed over the metal surface so as to prevent tarnishing or oxidation of the metal. Usually other metalized films require backing for strength, but the backing must be flexible and foldable. In laminating the plastic with a backing the aluminum side may be placed against the backing so the reflective surface is inherently protected by the transparent film on which it is deposited. While a few fold lines may be tolerated without seriously affecting the focal zone, wrinkles and a large number of creases may so affect the focus of the segments as to partially or wholly impair the utility of the cooker. It is preferable to have a device which will stand repeated folding and unfolding without acquiring an undue amount of permanent creases and wrinkles, since the device must be foldable for optimum utility.

The surface may be prepared in several ways. The method described is to make the metalized plastic, bond it to a backing, and then cut into generally triangular shaped pieces. The pieces are then joined, as by sewing, cementing, fusing, etc., into the proper shape. In preparing the covering from segments it is highly important that the segments be precisely cut and assembled to form the correct reflective surface. The covering for the frame may first be made and then thin strips of aluminum cemented or otherwise bonded to the shaped covering. A sheet of thermo-plastic material may be heated, stretched over an open frame, and cooled so as to provide a one piece cover. The one piece cover may then be metalized. The reflector may, also, be made of a one piece metalized plastic or cloth by making permanent "tucks" in the material, as by heat sealing, cementing, sewing, etc., and then securing the completed reflector to the frame.

Figure 5:
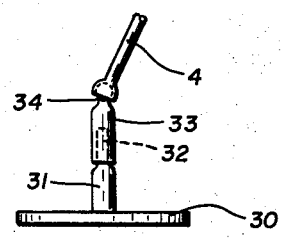
Fig. 5 is an elevational view of a modified stand for supporting a solar cooker.

The parabolic member 1 and its rod 4 may be supported by various means, and in Fig. 1 the base plate 7 with a spike 10 illustrates one method. In Fig. 2, a spike 28 which is connected directly to the joint 8 has a foot pedal 29 extending laterally therefrom. The spike is arranged to be pushed into the ground by means of the foot pedal 29. The reflective surface may be moved up and down by the joint or rotated through the spike to a position to gather the sun's rays for correctly focusing on the food held on a food support. The spike arrangement is valuable for such a device where ground is available for the entry of the spike; however, in certain instances the same may not be available, so different means must be provided. The device of Fig. 5 illustrates a base 30 with an upstanding boss 31 laterally projecting from one side thereof. The boss has a small diameter projection 32 which is arranged to telescope with an overriding member 33, which has a ball socket arrangement 34 on the end thereof. The ball socket 34 provides a connection for the rod 4 at substantially any angle from the base so that the reflecting surface can be faced directly to the sun.

Figure 6:
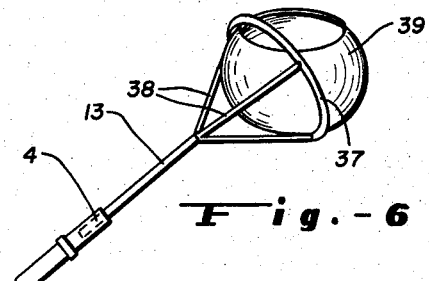
Fig. 6 is a perspective detail of a food container holder for supporting the same in the focal zone of a solar cooker.

A cooking support is arranged on the end of the rod 13, and since various types of foods are cooked with such a cooker, various types of supports are provided. For example, the grill of Fig. 1 may be used to cook solid meats or support utensils for foods whereas a different support might be provided for various containers for foods. The device of Fig. 6 includes a fixed ring utensil support 37 mounted on a tripod base 38, which is connected to the telescoping rod 13. The ring 37 supports a vessel 39, which is blackened on the outside for better absorption of heat, for holding liquids to be cooked. The ring may, also, support a grill which has a flange or series of projections which fit around the ring for supporting various solid foods on the grill. Since the ring will usually set at an angle, a raised edge or flange on the grill should be provided to hold the food thereon.

Figure 7:
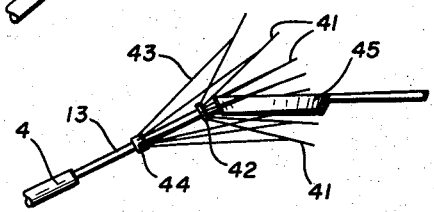
Fig. 7 is an elevational view of a modified food container holder.
Figure 9:
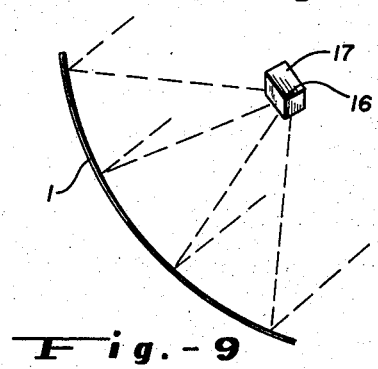
Fig. 9 is a schematic view of the outline of the reflective surface and the focal zone.

A collapsible vessel holder is illustrated in Fig. 7, in which a series of fingers or ribs 41 are mounted on a fixed pivot 42 which is secured to the end of the rod 13. The number of fingers is, generally, between six and twelve. The rod 13 is adjustably telescoped in the reflector surface rod 4. A brace 43 is connected with each of the members 41 adjacent the end thereof. The opposite end of the member 43 is connected with a slide ring 44 which is reciprocally disposed on the rod 13. Movement of the slide ring 44 away from the fixed pivot 42 forces the members 41 into spread position so that a cooking pan or vessel 45 may be placed in the opening of the members. This cooking utensil support is similar to the framework of the reflective surface, and is collapsible so as to fold into a small package for mobility and opens to make a holder for various types of vessels.

Figure 8:
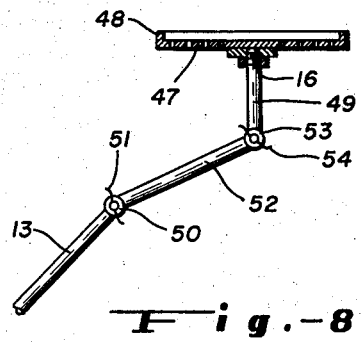
Fig. 8 is an elevational view of still another modified food container holder with adjustments for selectively placing the holder in the focal zone of a solar cooker.

A grill 47 having a raised edge 48 is mounted on a short rod 49, illustrated in Fig. 8, and is arranged to be placed at about the focal zone 16 of the cooker. A unidirectional joint 50 controlled by a thumb screw 51 permits a rod 52 to move in one direction, and a uni-directional joint 53 controlled by a thumb screw 54 interconnects rod 52 and rod 49 so that the grill 47 may be placed in substantially any position around the point 16. The rod 13 telescopes into rod 4 and is arranged to provide a differential in length so that the grill can be moved out of the hottest zone into a cooler zone for various types of cooking. The rod 13 may be provided with various clamp means so as to insure holding it in place. Also, the unidirectional joints may be replaced with universal joints, which will provide an easily adjustable support in any desired position. A shield or protector may be placed above the food or utensil holder to prevent injury to the user, and, also, to reflect heat onto the top of the food or at least hold the heat near the focal zone. A circular sheet of metal juxtaposed above the holder is satisfactory for such a shield.

Since the cooking of food involves cooking various types, it is preferable to provide the solar cooker with interchangeable perforated grills or screens, and utensil holders so that the user of the grill may utilize whichever type of cooking he desires. Also, blackened holders and utensils are preferred since shiny metal surfaces will reflect the reflected rays and little heat will be absorbed by the support or the vessel.

While the invention has been illustrated by specific examples, there is no intent to limit the device to the precise details so described, except insofar as set forth in the following claims.

I claim:

1. A solar cooker comprising a generally umbrella-shaped reflector including a series of generally triangular-shaped segments formed of flexible material and arranged with their vertices at a common point, said segments having the bases of substantial length opposite said vertices and arranged to form the periphery of said reflector, said segments being of like form and each constituting a portion of a parabolic cylinder, adjacent said segments being joined together along their sides, the median line of each said segment extending from its vertex to its base being a parabola of predetermined form, the vertex of said parabola being at said common point, a plurality of flexible ribs having their inner ends located at said common point, each said rib lying along a joinder line between adjacent said segments, each said rib having its outer end attached to the periphery of said reflector, each said segment having a bright reflective inner surface of a character to reflect heat to a focal zone with such heat distributed in a plane through the common focus of said parabolas, and means for supporting material to be heated located substantially at said focal zone.

2. A solar cooker as set forth in claim 1 and including a shaft extending through said common point and through said common focus, and a plurality of braces extending outwardly from said shaft, each said brace having its outer end secured to a said rib.

3. A solar cooker as set forth in claim 1 where said segments are of relatively thin plastic film having a metallized inner surface.

References Cited in the file of this patent

UNITED STATES PATENTS

| | | |
|---|---|---|
| 73,355 | Marshall | Jan. 14, 1868 |
| 134,828 | Watson | Jan. 14, 1873 |
| 492,048 | Phillips | Feb. 21, 1893 |
| 820,127 | Pope | May 8, 1906 |
| 930,406 | McDonald | Aug. 10, 1909 |
| 964,050 | Parsons | July 12, 1910 |
| 1,424,932 | Moreau | Aug. 8, 1922 |
| 2,387,038 | Owens | Oct. 16, 1945 |
| 2,586,583 | Wagner | Feb. 19, 1952 |
| 2,643,843 | Brown | June 30, 1953 |
| 2,671,459 | Henderson | Mar. 9, 1954 |
| 2,760,482 | Tarcici | Aug. 28, 1956 |
| 2,770,229 | Tarcici | Nov. 13, 1956 |
| 2,770,230 | Tarcici | Nov. 13, 1956 |
| 2,798,478 | Tarcici | July 9, 1957 |
| 2,806,134 | Tarcici | Sept. 10, 1957 |

FOREIGN PATENTS

| | | |
|---|---|---|
| 382,695 | Germany | Oct. 5, 1923 |